US012770215B2

(12) United States Patent
Mei et al.

(10) Patent No.: US 12,770,215 B2
(45) Date of Patent: Oct. 20, 2026

(54) METHODS, SYSTEMS, AND NON-TRANSITORY STORAGE MEDIA FOR GRAPHICS MEMORY ALLOCATION

(71) Applicant: Alipay (Hangzhou) Information Technology Co., Ltd., Hangzhou (CN)

(72) Inventors: Xiaofeng Mei, Hangzhou (CN); Yao Zhang, Hangzhou (CN); Junping Zhao, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 217 days.

(21) Appl. No.: 18/344,500

(22) Filed: Jun. 29, 2023

(65) Prior Publication Data

US 2024/0005446 A1 Jan. 4, 2024

(30) Foreign Application Priority Data

Jun. 29, 2022 (CN) ........................ 202210748218.X

(51) Int. Cl.
*G06T 1/60* (2006.01)

(52) U.S. Cl.
CPC ..................................... *G06T 1/60* (2013.01)

(58) Field of Classification Search
CPC . G06T 1/60; G06T 1/20; G06F 9/5016; G06F 9/5038; G06F 9/5077; G06F 9/50; G06F 9/5005
See application file for complete search history.

(56) References Cited

U.S. PATENT DOCUMENTS 6,058,460 A * 5/2000 Nakhimovsky ....... G06F 12/023 711/152
6,950,107 B1 * 9/2005 Moreton .................. G06T 1/60 712/225

(Continued)

FOREIGN PATENT DOCUMENTS

CN 110458285 B * 5/2021 ............. G06N 3/063
CN 113391926 A * 9/2021 ........... G06F 9/4812
CN 113448720 A * 9/2021 ......... G06F 9/44505

OTHER PUBLICATIONS

Chen, Tianqi et al. Training Deep Nets with Sublinear Memory Cost [online]. Apr. 22, 2016 [retrieved on Apr. 10, 2025]. Retrieved from the Internet: <URL: https://arxiv.org/pdf/1604.06174> (Year: 2016).*

(Continued)

*Primary Examiner* — King Y Poon
*Assistant Examiner* — Michelle Hau Ma
(74) *Attorney, Agent, or Firm* — Fish & Richardson P.C.

(57) ABSTRACT

In response to a graphics memory allocation request generated during the running of a target task and for graphics memory needed during running of the target task, target data generated during running of each sub-task of multiple sub-tasks is classified, where a type of the target data comprises at least first data, and where the first data is not used by a subsequent sub-task. Multiple target graphics memory pools are allocated to the multiple sub-tasks. Each target graphics memory pool of the multiple target graphics memory pools is divided into at least one graphics memory block based on a type of the target data, where the at least one graphics memory block includes at least a first graphics memory block corresponding to the first data, and where multiple first graphics memory blocks corresponding to the multiple sub-tasks are mapped to a same target physical memory address.

20 Claims, 4 Drawing Sheets

002

(56) References Cited

U.S. PATENT DOCUMENTS

| | | | | |
|---|---|---|---|---|
| 10,380,712 | B2 * | 8/2019 | Smith | G06T 1/20 |
| 10,650,580 | B2 * | 5/2020 | Engh-Halstvedt | G06T 1/20 |
| 10,880,401 | B2 * | 12/2020 | Maharana | G06F 9/45558 |
| 2006/0236059 | A1 * | 10/2006 | Fleming | G06F 12/0223<br>711/170 |
| 2015/0032986 | A1 * | 1/2015 | Moore | G06F 9/00<br>711/171 |
| 2016/0253257 | A1 * | 9/2016 | Kim | G06F 3/0679<br>711/166 |
| 2019/0171557 | A1 * | 6/2019 | Lyons | G06F 12/0638 |
| 2019/0236749 | A1 * | 8/2019 | Gould | G06T 1/20 |
| 2020/0098082 | A1 * | 3/2020 | Gutierrez | G06F 12/02 |

OTHER PUBLICATIONS

Gao et al. Estimating GPU Memory Consumption of Deep Learning Models [Online]. Nov. 8, 2020 [Retrieved on Aug. 13, 2025]. Retrieved from the Internet: <URL: https://dl.acm.org/doi/abs/10.1145/3368089.3417050 > (Year: 2020).*

Yang et al. Prediction of the Resource Consumption of Distributed Deep Learning Systems [Online]. Jun. 6, 2022 [Retrieved on Aug. 14, 2025]. Retrieved from the Internet <URL: https://dl.acm.org/doi/abs/10.1145/3530895 > (Year: 2022).*

Lim et al., "Zico: Efficient GPU Memory Sharing for Concurrent DNN Training," Paper, Presented at Proceedings of the 2021 USENIX Annual Technical Conference, virtual event, Jul. 14-16, 2021; USENIX, Jul. 2021, pp. 523-536, 15 pages.

* cited by examiner

METHODS, SYSTEMS, AND NON-TRANSITORY STORAGE MEDIA FOR GRAPHICS MEMORY ALLOCATION

CROSS-REFERENCE TO RELATED APPLICATIONS

This application claims priority to Chinese Patent Application No. 202210748218.X, filed on Jun. 29, 2022, which is hereby incorporated by reference in its entirety.

TECHNICAL FIELD

This specification relates to the field of computer technologies, and in particular, to methods, systems, and non-transitory storage media for graphics memory allocation.

BACKGROUND

A graphics processing unit (GPU) is a type of widely used acceleration hardware that is characterized by high-performance computing acceleration and can perform high-speed parallel computing. It is suitable for tasks that can be processed in parallel, and is widely applied to training and online services of AI (artificial intelligence) and deep learning. In an application process of a GPU, most functional tasks are run on the GPU, especially functional tasks that need strong computing power support. In online service scenarios, for higher throughput performance or higher resource utilization, multiple GPUs are often arranged on a single physical machine node, and parallel operation is performed on multiple online service instances of each GPU deployment model. Each instance can independently provide a service capability. However, a graphics memory capacity of the GPU is limited (which is usually, for example, 16 GB or 32 GB). A limited graphics memory directly limits a quantity of parallel instances of the model, or limits large-scale online computing tasks. Therefore, reducing a graphics memory capacity of each instance during operation is very important for increasing an operation amount.

Therefore, methods, systems, and non-transitory storage media for graphics memory allocation that can reduce a graphics memory capacity and optimize GPU graphics memory utilization need to be provided.

SUMMARY

This specification provides methods, systems, and non-transitory storage media for graphics memory allocation that can reduce a graphics memory capacity and optimize GPU graphics memory utilization.

According to a first aspect, this specification provides a method for graphics memory allocation, used to allocate a graphics memory needed during running of a target task, where the target task includes multiple serial sub-tasks, and the method for graphics memory allocation includes the following: in response to a graphics memory allocation request generated during the running of the target task, target data generated during running of each of the multiple sub-tasks are classified, where a type of the target data includes at least first data, and the first data are not used by a subsequent sub-task; multiple target graphics memory pools are allocated to the multiple sub-tasks; and each of the multiple target graphics memory pools is divided into at least one graphics memory block based on the type of the target data, where the at least one graphics memory block includes at least a first graphics memory block corresponding to the first data, and the multiple first graphics memory blocks corresponding to the multiple sub-tasks are mapped to a same target physical memory address.

In some embodiments, the method for graphics memory allocation further includes the following: during the running of each sub-task: the target data are stored in a corresponding graphics memory block based on the type of the target data; and graphics memory space corresponding to the target physical memory address is released to the first data of a next sub-task after the running of a current sub-task ends.

In some embodiments, that target data generated during running of each of the multiple sub-tasks are classified includes the following: a type label is added to the target data based on the type of the target data, where the type label includes at least a first label corresponding to the first data.

In some embodiments, that each of the multiple target graphics memory pools is divided into at least one graphics memory block based on the type of the target data includes the following: at least a part of graphics memory space of each target graphics memory pool is divided into the first graphics memory block, and the first graphics memory block is allocated to the first data; and the multiple first graphics memory blocks are mapped to the target physical memory address.

In some embodiments, the multiple first graphics memory blocks are virtual graphics memories, and that the multiple first graphics memory blocks are mapped to the target physical memory address includes the following: the multiple first graphics memory blocks are mapped to multiple virtual graphics memories based on a singleton pattern; and the multiple virtual graphics memories are mapped to the target physical memory address, and multiple virtual graphics memory pointers are fed back, where each of the multiple virtual graphics memory pointers includes the target physical memory address and a capacity of the first graphics memory block corresponding to the virtual graphics memory pointer.

In some embodiments, the type of the target data further includes second data, the second data are used by a subsequent sub-task, the type label further includes a second label corresponding to the second data, and the at least one graphics memory block further includes a second graphics memory block corresponding to the second data; and that each of the multiple target graphics memory pools is divided into at least one graphics memory block based on the type of the target data further includes the following: at least a part of the graphics memory space of each target graphics memory pool is divided into the second graphics memory block, and the second graphics memory block is allocated to the second data.

In some embodiments, the second data include input data, output data, and default data; the second label includes the following: an input data label, corresponding to the input data; an output data label, corresponding to the output data; and a default data label, corresponding to the default data; and the second graphics memory block includes the following: an input/output graphics memory block, corresponding to the input data and the output data; and a default graphics memory block, corresponding to the default data.

In some embodiments, the first data include activation value data and workspace data; the first label includes the following: an activation value data label, corresponding to the activation value data; and a workspace data label, corresponding to the workspace data; and the first graphics memory block includes the following: an activation value graphics memory block, corresponding to the activation value data; and a workspace graphics memory block, corresponding to the workspace data.

According to a second aspect, this specification provides a system for graphics memory allocation, including at least one storage medium, storing at least one instruction set used to allocate a graphics memory needed during running of a target task, where the target task includes multiple serial sub-tasks; and at least one processor, communicatively connected to the at least one storage medium, where when the system for graphics memory allocation runs, the at least one processor reads the at least one instruction set, and performs the method for graphics memory allocation according to the first aspect based on instructions of the at least one instruction set.

According to a third aspect, this specification provides a non-transitory storage medium, storing at least one instruction set used to allocate a graphics memory needed during running of a target task, where the target task includes multiple serial sub-tasks, and when the at least one instruction set is executed by a processor, the processor implements the method for graphics memory allocation according to the first aspect based on the at least one instruction set.

It can be seen from the above-mentioned technical solutions, according to the methods, systems, and non-transitory storage media for graphics memory allocation provided in this specification, target data generated by each serial sub-task are labeled so that the target data are classified into first data that are not used by a subsequent sub-task and second data that can be used by a subsequent sub-task. After the running of the current sub-task ends, the first data generated by the current sub-task can be cleared. According to the methods, systems, and non-transitory storage media for graphics memory allocation provided in this specification, a part of a GPU graphics memory can be divided into multiple target graphics memory pools, and the multiple target graphics memory pools can be allocated to the multiple sub-tasks, respectively. Each target graphics memory pool is divided into a first graphics memory block for storing the first data and a second graphics memory block for storing the second data. The second graphics memory blocks corresponding to different sub-tasks point to different physical memory addresses, and the first graphics memory blocks corresponding to different sub-tasks point to the same target physical memory address based on the singleton pattern by using virtual graphics memory pointers. As such, the first data in different target graphics memory pools corresponding to the different sub-tasks are stored at the same target physical memory address across the graphics memory pools by using different virtual addresses. When multiple sub-tasks are serial, only one sub-task is run at a time, and therefore only the first data of one sub-task occupy the target physical memory address. After the running of the current sub-task ends, the first data corresponding to the current sub-task are cleared, and the target physical address is released for use by a next sub-task. The methods, systems, and non-transitory storage media for graphics memory allocation provided in this specification can improve GPU graphics memory utilization, reduce a graphics memory capacity occupied for model running, and optimize use of the GPU graphics memory, thereby improving an operation amount of a GPU.

Other functions of the methods, systems, and non-transitory storage media for graphics memory allocation provided in this specification are partially illustrated in the following description. According to the description, content described by the following numbers and examples will be clear to a person of ordinary skill in the art. Inventive aspects of the methods, systems, and non-transitory storage media for graphics memory allocation provided in this specification can be fully explained by practice or by using methods, apparatuses, and combinations thereof described in the following detailed examples.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following description merely show some embodiments of his specification, and a person of ordinary skill in the art can still derive other drawings from these accompanying drawings without creative efforts.

DESCRIPTION OF EMBODIMENTS

Figure 1:
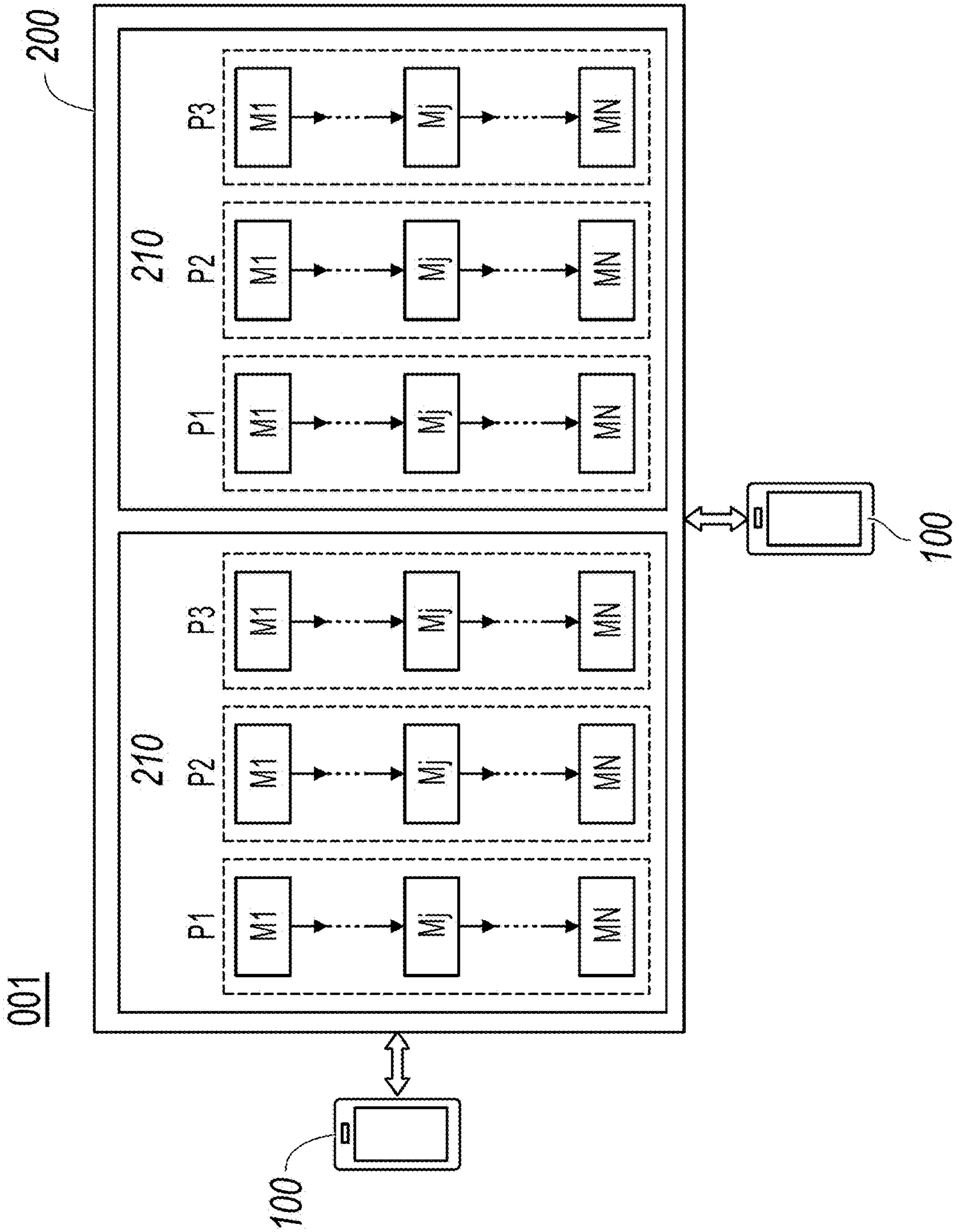
FIG. 1 is a diagram illustrating a system architecture of a system for graphics memory allocation, according to embodiments of this specification.

The following description provides specific application scenarios and requirements of this specification for the purpose of enabling a person skilled in the art to create and use the content of this specification. Various local modifications to the disclosed embodiments will be clear to a person skilled in the art, and generic principles defined here can be applied to other embodiments and applications without departing from the spirit and scope of this specification. Therefore, this specification is not limited to the embodiments illustrated, but extends to the widest scope that is consistent with the scope of the claims.

The terms used here are merely used for describing specific example embodiments, but are not used as limitations. For example, the terms "a", "one", and "the" of singular forms used here can also include plural forms, unless otherwise specified in the context clearly. When used in this specification, the terms "comprise", "include", and/or "have" mean that associated integers, steps, operations, elements, and/or components exist, but the existence of one or more other features, integers, steps, operations, elements, components, and/or groups is not excluded, or other features, integers, steps, operations, elements, components, and/or groups can be added to the systems/methods.

These and other features of this specification, the operations and functions of related elements of structures, and the economy of the combinations and manufacture of components can be significantly improved in view of the following description. With reference to the accompany drawings, all of these descriptions form a part of this specification. However, it should be clearly understood that, the accompany drawings are for the purposes of illustration and description only and are not intended to limit the scope of this specification. It should also to be understood that, the accompany drawings are not drawn in proportion.

A flowchart used in this specification illustrates operations implemented by a system according to some embodiments of this specification. It should be clearly understood that, the operations in the flowchart can be implemented based on different sequences. Instead, the operations can be performed in a reverse sequence or simultaneously. In addition, one or more other operations can be added to the flowchart, and one or more operations can be removed from the flowchart.

For ease of illustration, before the description starts, terms referenced in the following description are explained as follows:

Throughput: a volume of data (measured in bits, bytes, packets, etc.) successfully transmitted in a unit of time to a network, a device, a port, a virtual circuit, or another facility.

Deep learning: DL for short, a typical machine learning series method based on a deep neural network (DNN).

GPU: a widely used microprocessor capable of reducing CPU dependence and performing some work originally handled by a CPU. The GPU is a type of acceleration hardware that can be used for graphics display and computing acceleration. The GPU is characterized by high-speed parallel computing and is suitable for tasks that can be processed in parallel, for example, current typical deep learning tasks. The GPU can improve performance by 5 to 10 times compared with a CPU.

Graphics memory: a high-speed memory on a GPU card. It has a very high bandwidth (up to 700 GB+/sec) but a small capacity (typically, 16/32 GB), which consequently limits some deep learning tasks with large models and large samples.

Weight: used to describe features trained and ultimately determined by deep learning. During model inference, all weights are usually loaded onto a GPU of an inference device, and one computer node is often loaded with multiple instances of a model to ensure performance (e.g., throughputs), and consequently, many graphics memories are occupied. Each instance can independently provide a service capability.

Activation value: output result of an intermediate layer of a neural network model. It usually occupies largest space in a graphics memory needed by the neural network model.

GPU virtual memory: pointer visible to an application program, i.e. a virtual memory pointer, used to point to a physical memory address.

GPU virtual memory-physical memory mapping: a mechanism for associating and binding a virtual memory with a physical memory address.

Currently, deep learning (DL) algorithm models have been widely used in various scenarios such as payment (face), loss assessment (picture recognition), and interaction and customer services (audio recognition and content filtering). Tasks of typical deep learning algorithm models need strong computing power support. Therefore, currently, most of the tasks are run on acceleration devices such as GPUs. When a deep learning algorithm model performs an online inference service, requirements on a GPU graphics memory usually include the following four parts:

1. inputs and outputs of the model: occupying a small proportion;
2. intermediate results (activation values) generated during model computing and other temporary overheads (workspaces);
3. weights of the model: weights obtained by training by each layer of a typical model including multiple layers; a larger model indicates more instances and a larger sum of weights; and weights are already arranged in a graphics memory during initialization; and
4. overheads in GPU running: for example, overheads of context, cuDNN, and cuBLAS handles are usually fixed values.

A deep learning algorithm model is an extremely componentized and modular algorithm model. Currently, according to design ideas of commonly used deep learning frameworks such as Caffe, MXNet, and TensorFlow, the deep learning algorithm model is abstracted into a computing roadmap (i.e. a defined directed acyclic graph), and then the algorithm model is controlled to input a data flow for computing layer by layer. In addition, each layer has an input and an output, and the output of each layer is used as an input of a next layer to sequentially pass through each neural network layer in the computing roadmap to finally provide a result. In the existing technology, during running, a deep learning algorithm model used for academic research usually stores data (class 2 data) transmitted through each layer. With deeper neural network layers, more and more data need to be stored. Accordingly, more graphics memories need to be created for storing the data. Consequently, one deep learning algorithm model occupies a large amount of graphics memory space at the same time, and it is not conducive to allocation and reuse of graphics memory resources between multiple deep learning algorithm models. In an online inference scenario of a deep model, a user mainly focuses on a final value provided by the deep learning algorithm model, and other intermediate results are meaningless.

In the existing technology, during running of a model composed of multiple serial deep learning sub-models, when a GPU runs a sub-model task, the GPU allocates a part of a graphics memory owned by the GPU to the sub-model task for the running. Generally, a graphics memory is pre-allocated. In a computing process, every time computing of a sub-model task is completed, a graphics memory corresponding to the sub-model task is immediately released if data generated and fully used by the sub-model task are not needed by a subsequent functional task. However, each sub-model task is pre-allocated with a corresponding graphics memory, graphics memories corresponding to different sub-model tasks are independent of each other, and a graphics memory released by a previous sub-model task cannot be used by a subsequent sub-model task. Therefore, in case of serial running of a model, even if a graphics memory occupied by an intermediate result of a previous sub-model task is released in time, a graphics memory for an intermediate result needed by a next sub-model task is still cached in a respective graphics memory pool. Therefore, a model in the existing technology has high graphics memory consumption during running.

Methods, systems, and non-transitory storage media for graphics memory allocation provided in this specification are used to allocate graphics memories to multiple serial sub-tasks. Target data generated by each serial sub-task are labeled so that the target data are classified into first data that are not used by a subsequent sub-task and second data that can be used by a subsequent sub-task, and the first data of multiple sub-tasks share a same target physical memory address, thereby reducing graphics memory consumption.

FIG. 1 is a diagram illustrating a system architecture of a system 001 for graphics memory allocation, according to embodiments of this specification. Methods for graphics memory allocation provided in this specification can be applied to the system 001 for graphics memory allocation shown in FIG. 1. The methods for graphics memory allocation and the system 001 for graphics memory allocation provided in this specification can be used in an online inference service scenario of a model. The online inference service scenario can be performing online inference computing on new input data based on a trained model. The trained model can be any model, for example, a face recognition model, a data classification model, or a risk identification model, etc. For ease of description, the trained model is defined as a target task. In this specification, the target task can include multiple serial sub-tasks. As shown in FIG. 1, the system 001 for graphics memory allocation can include a client 100 and a server 200.

As shown in FIG. 1, the client 100 can be communicatively connected to the server 200. In some embodiments, the server 200 can be communicatively connected to multiple clients 100. In some embodiments, the client 100 can interact with the server 200 via a network to receive or send messages, etc. The client 100 can collect input data (input data of the target task) and send the input data to the server 200 based on the communication connection. In some embodiments, the client 100 can be installed with one or more applications (APPs). The APP can collect the input data for the client 100. In some embodiments, the client 100 can include a mobile device, a tablet computer, a notebook computer, a built-in device of a motor vehicle, or similar content, or any combination thereof. In some embodiments, the mobile device can include a smart household device, a smart mobile device, a virtual reality device, an augmented reality device, or a similar device, or any combination thereof. In some embodiments, the smart household apparatus can include a smart television or a desktop computer, etc., or any combination thereof. In some embodiments, the smart mobile device can include a smartphone, a personal digital assistant, a gaming device, or a navigation device, etc., or any combination thereof. In some embodiments, the virtual reality device or the augmented reality device can include a virtual reality helmet, virtual reality glasses, a virtual reality patch, an augmented reality helmet, augmented reality glasses, an augmented reality patch, or similar content, or any combination thereof. For example, the virtual reality device or the augmented reality device can include Google glasses, a head mounted display, or a VR, etc. In some embodiments, the built-in apparatus of the motor vehicle can include a vehicle-mounted computer or a vehicle-mounted television, etc. In some embodiments, the client 100 can be a device having a positioning technology for positioning a location of the client 100.

The server 200 can be a server that provides various services, for example, a backend server that provides support for pages displayed on the client 100. The server 200 can store data or instructions for performing the methods for graphics memory allocation described in this specification, and can execute or be configured to execute the data or the instructions. In some embodiments, the server 200 can include a hardware device having a data information processing function and a program necessary for driving the hardware device to work. An application program of the target task can be pre-installed on the server 200. The server 200 can be communicatively connected to multiple clients 100 and receive input data collected by the clients 100. The server 200 can perform the methods for graphics memory allocation described in this specification, receive the input data sent by the client 100, and perform inference computing on the input data based on the application program of the target task.

As shown in FIG. 1, the server 200 can include at least one piece of GPU hardware 210. One or more service instances (workers) of the target task can be deployed on each piece of GPU hardware 210. Each service instance can separately provide a service capability. Multiple service instances are run in parallel on the GPU hardware 210. For ease of description, a quantity of the service instances run on each piece of GPU hardware 210 is defined as L, where L is a positive integer not less than 1. The multiple service instances are respectively denoted as a service instance P1, a service instance P2, . . . , a service instance Pi, . . . , and a service instance PL, where i=1, 2, . . . , or L.

As described above, the target task can include multiple serial sub-tasks. For ease of description, a quantity of the sub-tasks is defined as N, where N is a positive integer greater than 1. The N sub-tasks are serial, i.e. the N sub-tasks are run in sequence when the target task is run. For ease of description, the N serial sub-tasks are sequentially denoted as a sub-task M1, a sub-task M2, . . . , a sub-task Mj, . . . , a sub-task MN based on a serial sequence, where j=1, 2, . . . , or N. In each service instance Pi, only one sub-task is run at a time.

Using FIG. 1 as an example, two pieces of GPU hardware 210 are shown in FIG. 1. Three service instances are run on each piece of GPU hardware 210 in FIG. 1. A person skilled in the art should understand that the quantities shown in FIG. 1 are merely example description, and another quantity of pieces of GPU hardware 210 and another quantity of service instances deployed on each piece of GPU hardware 210 also fall within the protection scope of this specification.

The server 200 can execute the data or the instructions for the methods for graphics memory allocation described in this specification, obtain resources and resource configuration policies of the GPU hardware 210, and allocate a graphics memory needed during running of each sub-task Mj.

Figure 2:
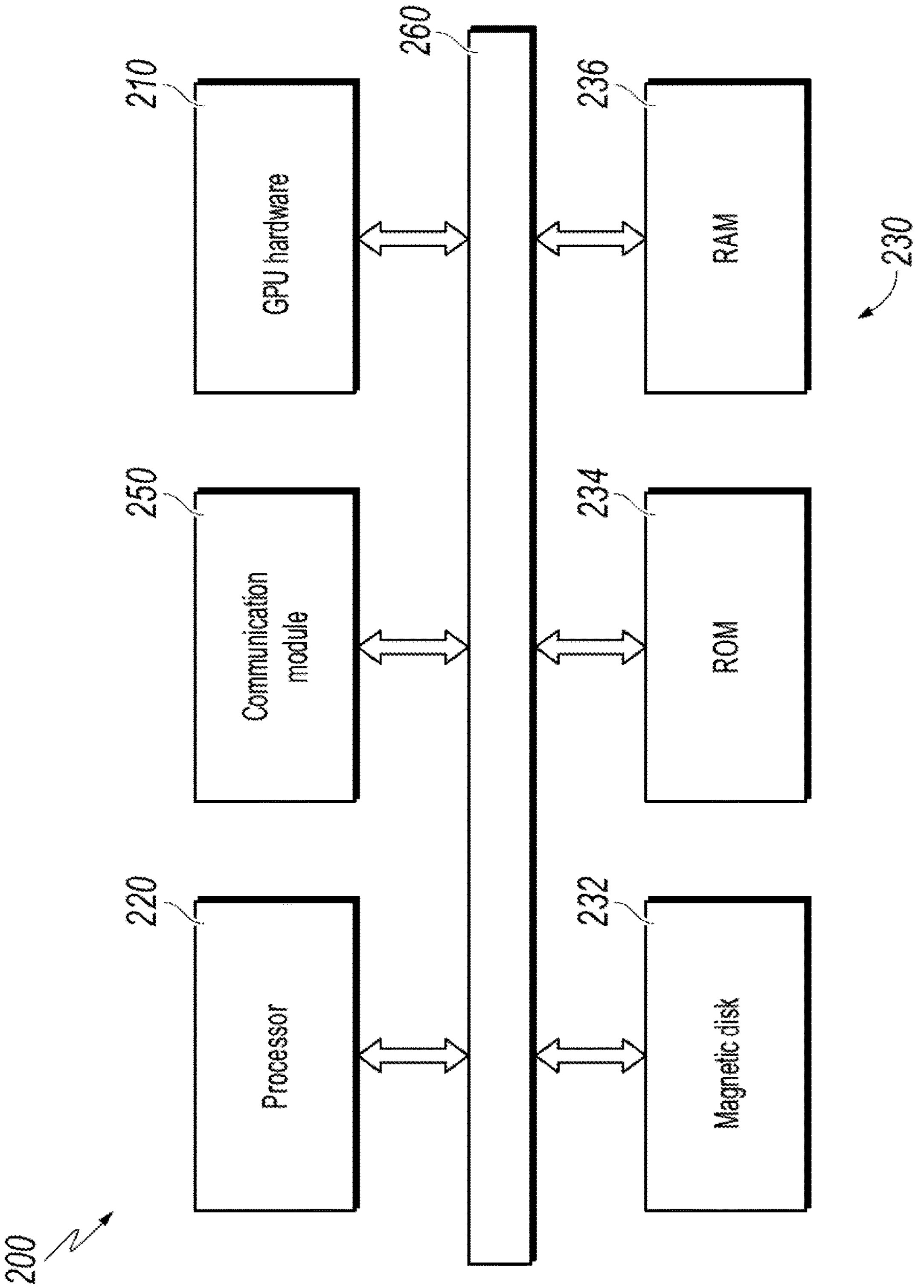
FIG. 2 is a diagram illustrating a hardware structure of a server, according to embodiments of this specification.

FIG. 2 is a diagram illustrating a hardware structure of a server 200, according to an embodiment of this specification. The server 200 can perform methods for graphics memory allocation described in this specification. The methods for graphics memory allocation are illustrated in detail in the following description. As described above, the server 200 can include at least one piece of GPU hardware 210. The server 200 can further include at least one processor 220 and at least one storage medium 230. In some embodiments, the server 200 can further include a communication module 250 and an internal communication bus 260.

The internal communication bus 260 can connect different system components, including the GPU hardware 210, the storage medium 230, the processor 220, and the communication module 250.

The storage medium 230 can include a data storage apparatus. The data storage apparatus can be a non-transitory storage medium or a transitory storage medium. For example, the data storage apparatus can include one or more of a magnetic disk 232, a read-only storage medium (ROM) 234, or a random access storage medium (RAM) 236. The storage medium 230 further includes at least one instruction set stored in the data storage apparatus. The instructions are computer program code. The computer program code can include a program, a routine, an object, a component, a data structure, a procedure, or a module, etc. for performing the methods for graphics memory allocation provided in this specification.

The at least one processor 220 can be communicatively connected to the at least one storage medium 230. The at least one processor 220 is configured to execute the at least one instruction set. When the server 200 runs, the at least one processor 220 reads the at least one instruction set and performs, based on instructions of the at least one instruction set, the methods for graphics memory allocation provided in this specification. The processor 220 can perform all steps included in the methods for graphics memory allocation. The processor 220 can be in a form of one or more processors. In some embodiments, the processor 220 can include one or more hardware processors, such as a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor capable of executing one or more functions, or any combination thereof. For a purpose of problem description only, only one processor 220 is described in the server 200 in this specification. However, it should be noted that, the server 200 in this specification can alternatively include multiple processors 220. Therefore, operations and/or method steps disclosed in this specification can be performed by one processor as described in this specification, or can be performed jointly by multiple processors. For example, if the processor 220 of the server 200 performs step A and step B in this specification, it should be understood that, step A and step B can alternatively be jointly or separately performed by two different processors 220 (for example, a first processor performs step A and a second processor performs step B, or the first and second processors jointly perform steps A and B).

The communication module 250 can be connected to the processor 220 for data communication between the server 200 and an external environment, for example, the server 200 and the client 100. The communication module 250 can include at least one of a wired communication module and a wireless communication module.

Figure 3:
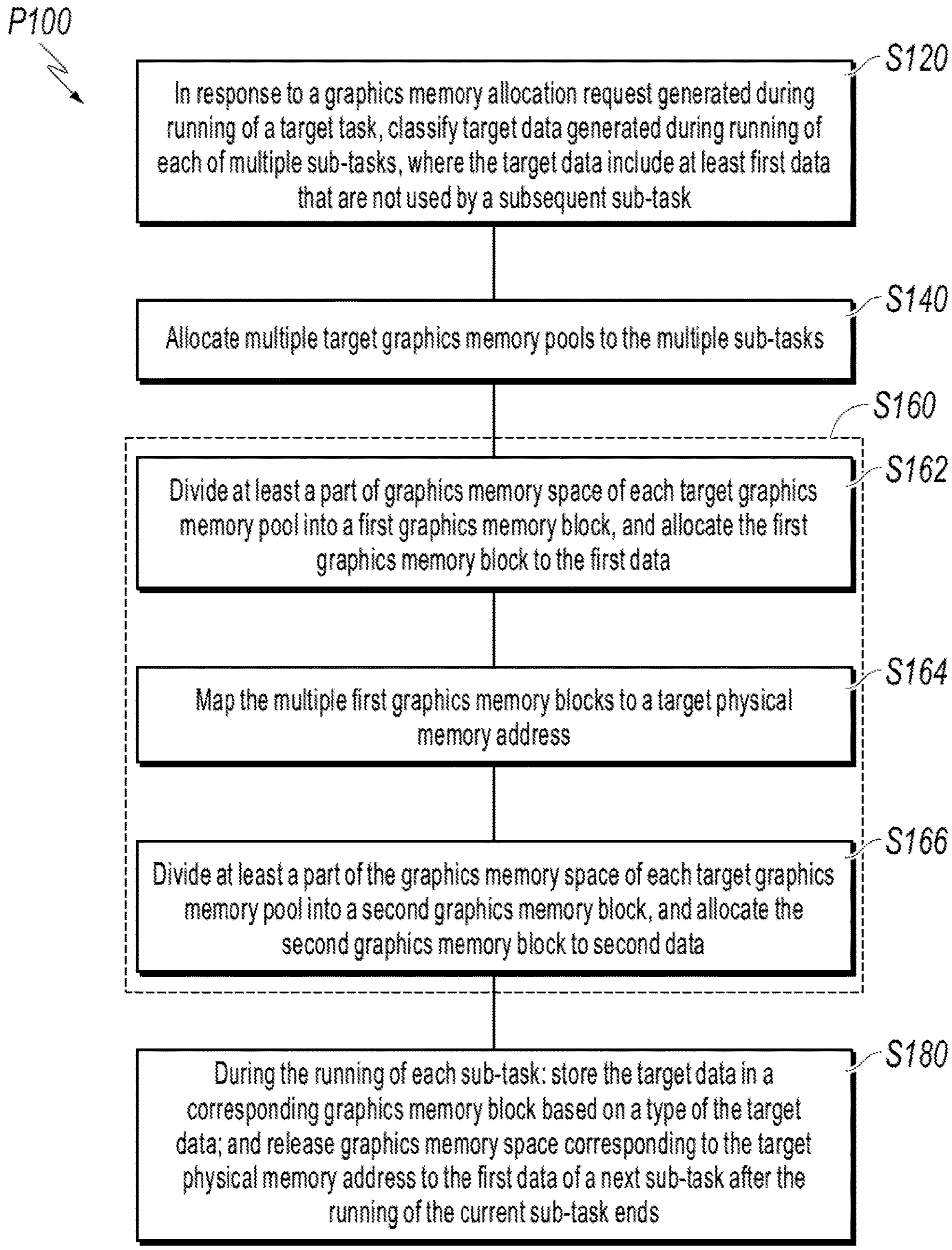
FIG. 3 is a flowchart illustrating a method for graphics memory allocation, according to embodiments of this specification.

FIG. 3 is a flowchart illustrating a method P100 for graphics memory allocation, according to an embodiment of this specification. As described above, the server 200 can perform the method P100 for graphics memory allocation described in this specification. Specifically, the processor 220 can read an instruction set stored in its local storage medium, and then perform, based on provisions of the instruction set, the method P100 for graphics memory allocation described in this specification. As shown in FIG. 3, the method P100 can include the following:

S120: In response to a graphics memory allocation request generated during running of a target task, classify target data generated during running of each of multiple sub-tasks.

As described above, the target task can be a task of performing an online inference operation service by a trained deep learning algorithm model. The sub-tasks can be serial sub-models in the target task. The sub-tasks can generate multiple types of target data during running. Different types of target data have different properties. In some embodiments, the target data can include at least first data. The first data can be data that are not used by a subsequent sub-task. The first data can be intermediate data generated during running of a current sub-task, such as intermediate data generated during computing of an intermediate layer of a neural network model. After the running of the current sub-task ends, the first data are not used by a sub-task to be subsequently run. In other words, after the running of the current sub-task ends, the first data generated during the running of the current sub-task become meaningless. In some embodiments, the first data can include activation value data and workspace data.

As described above, the deep learning algorithm model can be a neural network model. The neural network model can include multiple neural network layers. Each layer has an input and an output, and the output of each layer is used as an input of a next layer to sequentially pass through each neural network layer in a computing roadmap to finally provide a result. During running of the sub-tasks, data transmitted through each layer are usually stored. The activation value data are input values and output values of other neural network layers except an input value of the first layer and an output value of the last layer in the neural network model. The activation value data can also be referred to as an intermediate result generated during the running of the sub-tasks. During the running of the target task, the activation value data generated during running of each sub-task occupy a large graphics memory. In some embodiments, the graphics memory occupied by the activation value data is the largest among graphics memories needed during running of all the sub-tasks. In an online inference scenario of the deep model, a user mainly focuses on a final value provided by each sub-task, and other intermediate results are meaningless. Therefore, after the running of each sub-task ends, the activation value data generated during the running of the sub-task are no longer used. Therefore, after the running of each sub-task ends, the activation value data generated during the running of the sub-task can be cleared. Therefore, the activation value data can be stored in a separate graphics memory block.

The workspace data can include search workspace data (a search workspace) and can also include computing workspace data (a computing workspace). A graphics memory occupied by the search workspace data is large and temporary. A life cycle of the search workspace data is limited within an operator search range. After the running of each sub-task ends, the search workspace data are no longer needed. Therefore, after the running of each sub-task ends, the search workspace data generated during the running of the sub-task can be cleared. Similarly, after the running of each sub-task ends, the computing workspace data are no longer needed. Therefore, after the running of each sub-task ends, the computing workspace data generated during the running of the sub-task can be cleared. Therefore, the workspace data can be stored in a separate graphics memory block.

In some embodiments, the target data can further include second data. The second data can be used by a subsequent sub-task. For example, the second data can be input data and output data generated during the running of the current sub-task. After the current sub-task ends, the input data and the output data may continue to be used by a subsequent sub-task. Therefore, the second data need to be retained before the running of all the sub-tasks ends. In some embodiments, the second data can include input data, output data, and default data.

The input data can be data that are input into the current sub-task. In some embodiments, the input data of the current sub-task can be output data of a previous sub-task adjacent to the current sub-task. In some embodiments, the input data of the current sub-task can further include output data of any one or more sub-tasks prior to the current sub-task. The output data can be data output by the current sub-task. In some embodiments, the output data of the current sub-task can be input data of a next sub-task adjacent to the current sub-task. In some embodiments, the output data of the current sub-task can further include input data of any one or more sub-tasks subsequent to the current sub-task. The input data and the output data need to be exchanged between different sub-tasks. Therefore, the input data and the output data each have a long life cycle and may need to be transferred between different sub-tasks. The input data and the output data occupy a graphics memory of a relatively fixed size. Therefore, the input data and the output data can be placed in a separate graphics memory block without sharing a graphics memory block with other data. After the running of the current sub-task ends, the graphics memory block used for storing the input data and the output data is not cleaned up to ensure that the input data and the output data can be retained.

The other data can be default parameters of the target task, such as weights. The other data occupy a graphics memory of a fixed size. The other data can be reused during the running of the target task. Therefore, the other data can be placed in a separate graphics memory block, and the graphics memory block used for storing the other data is not cleaned up to ensure that the other data can be retained.

In some embodiments, step S120 can be as follows: The server 200 adds a type label to the target data based on a type of the target data. The server 200 can label different types of target data by adding type labels via step S120, so as to distinguish between the different types of target data, thereby laying a foundation for applying different graphics memory allocation policies to the different types of target data. The type label can be any form of label that can be used to distinguish between different types. For example, the type label can be a data label, and different types of target data are labeled as different data. For example, the type label can be a symbol label, and different types of target data are labeled as different symbols, etc. In some embodiments, the type label can include a first label corresponding to the first data. The server 200 can label the first data by using the first label. In some embodiments, the first label can include an activation value data label and a workspace data label. The activation value data label can correspond to the activation value data. The server 200 can label the activation value data by using the activation value data label. The workspace data label can correspond to the workspace data. The server 200 can label the workspace data by using the workspace data label. In some embodiments, the type label can further include a second label corresponding to the second data. The server 200 can label the second data by using the second label. In some embodiments, the second label can include an input data label, an output data label, and a default data label. The input data label can correspond to the input data. The server 200 can label the input data by using the input data label. The output data label can correspond to the output data. The server 200 can label the output data by using the output data label. The default data label can correspond to the default data. The server 200 can label the default data by using the default data label.

As shown in FIG. 3, the method P100 can further include the following:

S140: Allocate multiple target graphics memory pools to the multiple sub-tasks.

The multiple sub-tasks are in a one-to-one correspondence with the multiple target graphics memory pools. As described above, the multiple sub-tasks are denoted as N sub-tasks. The N sub-tasks correspond to N target graphics memory pools. Each of the N target graphics memory pools is used to store the target data generated during running of a sub-task corresponding to the target graphics memory pool. The server 200 can allocate at least a part of graphics memory space of a GPU graphics memory to the target task. Specifically, the server 200 can divide at least the part of graphics memory space of the GPU graphics memory into N target graphics memory pools, and allocate the N target graphics memory pools to the N sub-tasks. In step S1140, the server 200 performs graphics memory allocation for the N sub-tasks by way of graphics memory pools.

The graphics memory pools refer to graphics memory capacity units obtained by dividing graphics memory space corresponding to the GPU hardware 210 in advance, so that the graphics memory space corresponding to the GPU hardware 210 is allocated to each of the N sub-tasks. To divide the graphics memory space corresponding to the GPU hardware 210, a capacity needed by each target graphics memory pool can be predetermined, and the target graphics memory pools can be divided based on the capacity. The capacity of each target graphics memory pool can be predetermined. In some embodiments, the server 200 can perform forward inference in advance to determine the capacity of the target graphics memory pool corresponding to each sub-task. In some embodiments, the server 200 can perform forward inference once to determine the capacity of each target graphics memory pool, or can perform forward inference multiple times to determine the capacity of each target graphics memory pool.

An implementation process of dividing the graphics memory space corresponding to the GPU hardware 210 can be performed by a GPU storage manager. A function of the GPU storage manager is similar to a function of a memory management unit (MMU), and is mainly to perform graphics memory management and provide hardware support for virtual and real address translation, etc.

As shown in FIG. 3, the method P100 can further include the following:

S160: Divide each of the multiple target graphics memory pools into at least one graphics memory block based on the type of the target data.

As described above, the type of the target data can include at least the first data. The at least one graphics memory block can include at least a first graphics memory block corresponding to the first data. The N sub-tasks correspond to N first graphics memory blocks. As described above, after running of a corresponding sub-task ends, the first data are no longer used by a subsequent sub-task. Therefore, after the running of the corresponding sub-task ends, the first data can be cleared so that graphics memory space corresponding to the first graphics memory block is released to the first data generated during running of a subsequent sub-task, thereby saving graphics memory space. In other words, the N first graphics memory blocks corresponding to the N sub-tasks can share a same piece of physical graphics memory space. For the N first graphics memory blocks to share a same piece of physical graphics memory space, the server 200 can map the N first graphics memory blocks corresponding to the N sub-tasks to a same target physical memory address. As the N sub-tasks are in a serial relationship, only one sub-task is run at a time. In other words, at one moment, only the first data of one sub-task can be stored in graphics memory space pointed to by the target physical memory address. Therefore, the server 200 can store, based on a characteristic of the N sub-tasks being serial and by way of time division (at different time points), the first data generated by each sub-task during running in the graphics memory space pointed to by the target physical memory address. As such, by way of time division (at different time points), the N sub-tasks can reuse the graphics memory space pointed to by the target physical memory address, thereby saving the graphics memory space occupied by the first data and optimizing GPU graphics memory allocation. At one moment, only one of the N sub-tasks can occupy the graphics memory space pointed to by the target physical memory address. In some embodiments, the server 200 can point the N first graphics memory blocks to the target physical memory address by way of virtual memory pointers.

Specifically, step S160 can include the following:

S162: Divide at least a part of graphics memory space of each target graphics memory pool into the first graphics memory block, and allocate the first graphics memory block to the first data.

S164: Map the multiple first graphics memory blocks to the target physical memory address.

In some embodiments, the first graphics memory blocks can be virtual graphics memories. Step S164 can be as follows: The server 200 maps the multiple first graphics memory blocks to multiple virtual graphics memories in a virtual graphics memory pool based on a singleton pattern; and maps the multiple virtual graphics memories to the target physical memory address, and feeds back multiple virtual graphics memory pointers. Each of the multiple virtual graphics memory pointers includes the target physical memory address and a capacity of the first graphics memory block corresponding to the virtual graphics memory pointer.

The virtual graphics memory refers to a use resource of the GPU hardware 210 that is obtained by each virtual machine in a process of simultaneously providing resources in at least a part of the graphics memory space corresponding to the GPU hardware 210 to multiple virtual machines for use (GPU virtualization). As a part of a virtual machine, the virtual graphics memory can implement a GPU computing function of the virtual machine. Therefore, the virtual graphics memory can serve as a constituent part of a virtual machine at a virtual machine level. In terms of a physical implementation, the virtual graphics memory is implemented based on the graphics memory space corresponding to the GPU hardware 210. In some embodiments, in graphics memory space corresponding to a same piece of GPU hardware 210, one physical GPU can correspond to multiple said virtual graphics memories.

The method for implementing a virtual graphics memory by the graphics memory space corresponding to the GPU hardware 210 is obtained by allocating resources in the graphics memory space corresponding to the GPU hardware 210 in dimensions such as time and space. The resources in the graphics memory space corresponding to the GPU hardware 210 include operation time periods and graphics memory space. Allocating a resource to a virtual graphics memory is allocating an operation time period in the graphics memory space corresponding to the GPU hardware 210 to the virtual graphics memory, and at the same time, allocating corresponding graphics memory space to the virtual graphics memory. Resources in the graphics memory space corresponding to the same piece of GPU hardware 210 can be allocated to multiple virtual graphics memories in the above-mentioned way. Each virtual graphics memory is provided to one virtual machine for use.

Mapping relationships between the N virtual graphics memories and the target physical memory address can be stored by using virtual graphics memory pointers. The N first graphics memory blocks correspond to the N virtual graphics memory pointers. Each virtual graphics memory pointer includes the target physical memory address and the capacity of the first graphics memory block corresponding to the virtual graphics memory pointer.

Mapping relationships between the N first graphics memory blocks and the target physical memory address can be designed based on the singleton pattern to ensure that only one first graphics memory block can be mapped to the target physical memory address at a time. The singleton pattern and the virtual graphics memory pointers enable target data belonging to the first data in different target graphics memory pools to be mapped to the same target physical memory address across the graphics memory pools. Therefore, the first data corresponding to different sub-tasks can share graphics memory space corresponding to the target physical memory address at different moments, thereby reducing graphics memory consumption.

In some embodiments, the first graphics memory block can include an activation value graphics memory block and a workspace graphics memory block. The activation value graphics memory block corresponds to the activation value data, and can be used to store the activation value data. The workspace graphics memory block corresponds to the workspace data, and can be used to store the workspace data. The activation value graphics memory block and the workspace graphics memory block can be independent of and spaced apart from each other. In some embodiments, each virtual graphics memory can include a virtual graphics memory corresponding to an activation value graphics memory block and a virtual graphics memory corresponding to a workspace graphics memory block. In this case, the target physical memory address can be a group of physical memory addresses. The target physical memory address can include an activation value physical memory address and a workspace physical memory address. The activation value physical memory address can correspond to the activation value graphics memory block and the activation value data. The workspace physical memory address can correspond to the workspace graphics memory block and the workspace data. Virtual graphics memories corresponding to activation value graphics memory blocks of different sub-tasks can be mapped to the activation value physical memory address. Virtual graphics memories corresponding to workspace graphics memory blocks of different sub-tasks can be mapped to the workspace physical memory address.

As described above, the type of the target data can alternatively be the second data. The at least one graphics memory block can further include a second graphics memory block corresponding to the second data. Specifically, step S160 can further include the following:

S166: Divide at least a part of the graphics memory space of each target graphics memory pool into the second graphics memory block, and allocate the second graphics memory block to the second data.

N second graphics memory blocks corresponding to the N sub-tasks point to N different physical memory addresses. The N different pieces of graphics memory space. As the second data need to be stored after the corresponding sub-tasks end, the N second graphics memory blocks cannot be shared. In some embodiments, the second graphics memory block can include an input/output graphics memory block and a default graphics memory block. The input/output graphics memory block corresponds to the input data and the output data, and can be used to store the input data and the output data. The default graphics memory block corresponds to the default data, and can be used to store the default data. The input/output graphics memory block and the default graphics memory block can be independent of and spaced apart from each other.

The first graphics memory block and the second graphics memory block can be independent of and spaced apart from each other.

A graphics memory capacity needed for each of the at least one graphics memory block can be obtained by using experiments or tests when graphics memory block division is performed on each target graphics memory pool. For example, the server 200 can collect some experiment data or test data as the input data, input the input data into the target task, and determine a graphics memory capacity needed for each target graphics memory pool and the graphics memory capacity needed for each graphics memory block during the running of the target task.

During the first test, the server 200 does not yet know a capacity size needed for each graphics memory block. By using conventional methods for graphics memory allocation and the first running of the target task, the server 200 can allocate a graphics memory to the target data generated during the running of each sub-task. In the first test, the server 200 needs to perform an operator search and selection, and also plans a graphics memory needed for the activation value data. With respect to the graphics memory for the activation value data, during the first test, graphics memory space for the activation value data is not a whole block yet, and block-by-block on-demand allocation from a corresponding target graphics memory pool is further needed. Therefore, a large total graphics memory is needed. Moreover, as the graphics memory space for the activation value data is not a whole block, frequent graphics memory reallocation is needed. Therefore, during the first test, the server 200 does not map the graphics memory space for the activation value data to the target physical address, but stores the activation value data in the default data graphics memory block.

For the workspace data, during the first test, the workspace data include the search workspace data and the computing workspace data, and the search workspace data have a very large size. Therefore, a graphics memory capacity of a workspace needed for the first test has a large size, which cannot represent a size of a graphics memory capacity of a workspace needed for normal running after stabilization. Therefore, in the first test, graphics memory space for the workspace data is not mapped to the target physical address, but the workspace data are stored in the default data graphics memory block.

The input data and the output data each may have a long life cycle and may be transferred between different sub-tasks. Therefore, to avoid mistakenly clearing the input data and the output data when cleaning up the target graphics memory pool, the input data and the output data are placed in the input/output graphics memory block since the first test. The graphics memory capacity occupied in the first test is substantially the same as a graphics memory capacity occupied in subsequent formal running. Therefore, a capacity size of the input/output graphics memory block can be determined from the first test.

After the first test ends and before the second test starts, whole-block graphics memory objects in the default graphics memory block are all cleared. As such, starting from the second test, a large object for a whole block of activation value data is directly allocated from the activation value graphics memory block.

When the second test starts, a switch is enabled to perform activation value data processing in the activation value graphics memory block. In addition, as an operator search is no longer necessary, a search workspace is no longer needed. Therefore, workspace data used in the second test are already all computing workspace data needed in computing. Therefore, the second test can more accurately determine by statistics collection a size of a graphics memory capacity needed for the computing workspace data. Therefore, in the second test, the server 200 collects statistics and compute a peak value of the workspace data reached during running so as to perform graphics memory allocation. However, the workspace data in the second test are still stored in the default graphics memory block.

When the second test ends, the default graphics memory block is also cleaned up first, and a whole block of graphics memory space whose size is equal to the peak value obtained by statistics collection is created as graphics memory space needed for the workspace graphics memory block. Providing a whole block of graphics memory to the workspace graphics memory block is for ease of sharing with a workspace graphics memory block in another sub-task. In addition, to avoid an object for a whole block of peak-value graphics memory from being insufficient, a Realloc interface is provided in the workspace graphics memory block so that when the object for the whole block of peak-value graphics memory is insufficient, further allocation can be performed from a backend.

In the third test, another switch is enabled to distribute allocation for the workspace data to the workspace graphics memory block. Starting from the third test, multiple first graphics memory blocks share the graphics memory space pointed to by the target physical memory address.

In some embodiments, the method P100 for graphics memory allocation further includes the following:

S180: During the running of each sub-task: store the target data in a corresponding graphics memory block in the target graphics memory pool based on the type of the target data; and release graphics memory space corresponding to the target physical memory address to the first data of a next sub-task after the running of a current sub-task ends.

Specifically, based on the type label corresponding to the target data, the server 200 can store the target data in a graphics memory block corresponding to the type label. After the running of each sub-task ends, the server 200 can clear data in the graphics memory space pointed to by the target physical memory address and release the graphics memory space pointed to by the target physical memory address to the first graphics memory block of a next sub-task.

Figure 4:
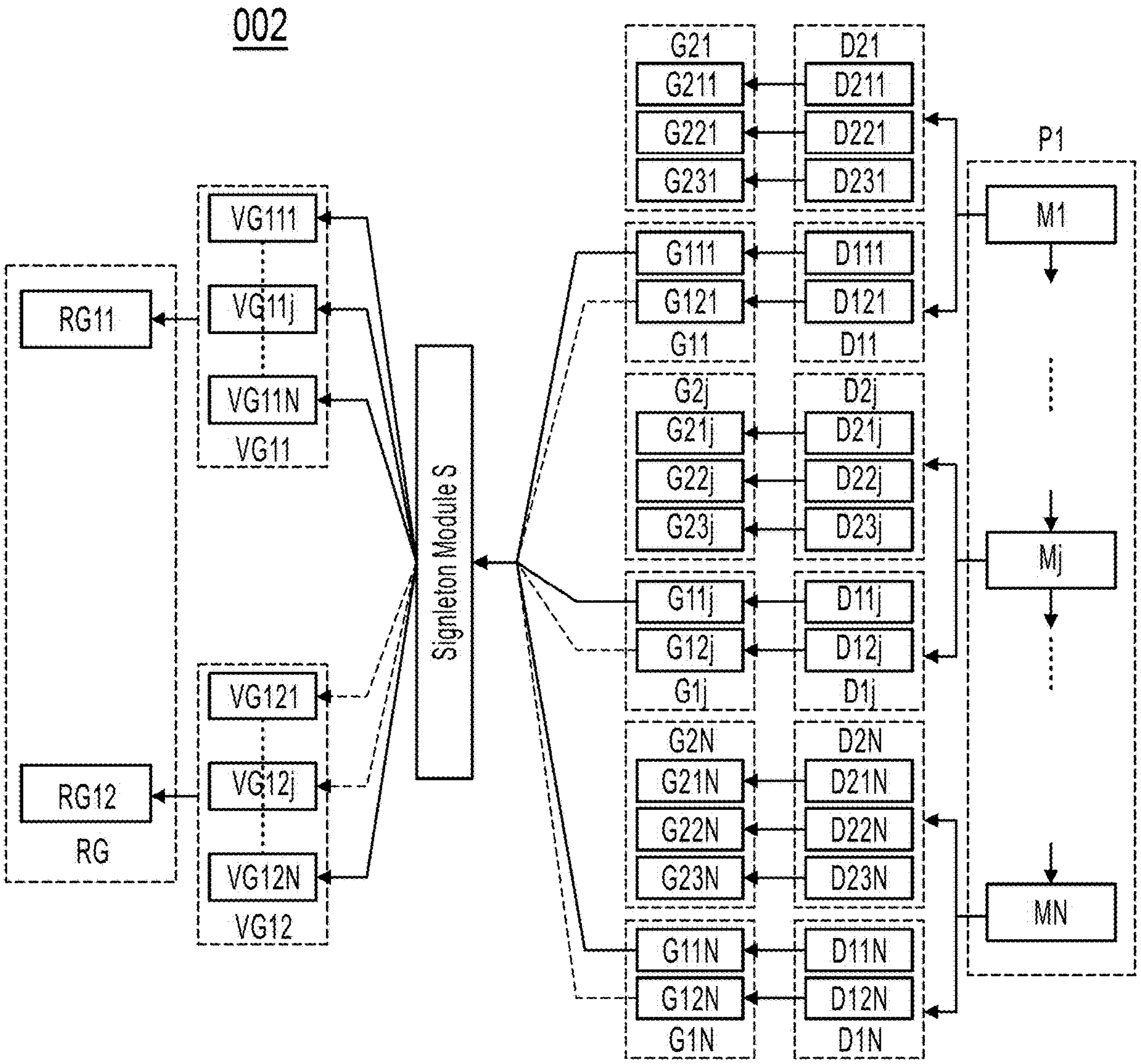
FIG. 4 is a schematic diagram illustrating a target data flow direction, according to embodiments of this specification.

FIG. 4 is a schematic diagram 002 illustrating a target data flow direction, according to an embodiment of this specification. FIG. 4 is a schematic diagram illustrating a target data flow direction occurring when a service instance P1 is running on the server 200. As shown in FIG. 4, N sub-tasks correspond to N target graphics memory pools. For ease of description, a target graphics memory pool corresponding to a sub-task Mj is defined as a target graphics memory pool Gj. The target graphics memory pool Gj can include a first graphics memory block G1*j* and a second graphics memory block G2*j*. The first graphics memory block G1*j* can include an activation value graphics memory block G11*j* and a workspace graphics memory block G12*j*. The second graphics memory block G2*j* can include an input/output graphics memory block G21*j* and a default graphics memory block G22*j*. Target data generated during running of the sub-task Mj are first data and second data. The first data are stored in the first graphics memory block G1*j*. The first data can include activation value data D11*j* and workspace data D12*j*. The activation value data D11*j* are stored in the activation value graphics memory block G1*lj*. The workspace data D12*j* are stored in the workspace graphics memory block G12*j*. The second data are stored in the second graphics memory block G2*j*. The second data can include input data D21*j*, output data D22*j*, and default data D23*j*. The input data D21*j* and the output data D22*j* are stored in the input/output graphics memory block G21*j*. The default data D23*j* are stored in the default graphics memory block G22*j*. The activation value graphics memory blocks G11*j* and the workspace graphics memory blocks G12*j* corresponding to different sub-tasks are provisioned to a virtual graphics memory pool by using a singleton module S. The activation value graphics memory blocks G11*j* corresponding to different sub-tasks are provisioned to an activation value virtual graphics memory pool VG11 by using the singleton module S. The activation value graphics memory blocks G11*j* corresponding to different sub-tasks correspond to different virtual graphics memories VG11*j*. The activation value virtual graphics memory pool VG11 points to an activation value physical memory address RG11. The workspace graphics memory blocks G12*j* corresponding to different sub-tasks are provisioned to a workspace virtual graphics memory pool VG12 by using the singleton module S. The workspace graphics memory blocks G12*j* corresponding to different sub-tasks correspond to different virtual graphics memories VG12*j*. The workspace virtual graphics memory pool VG12 points to a workspace physical memory address RG12. A target physical memory address RG can include the activation value physical memory address RG11 and the workspace physical memory address RG12.

In conclusion, according to the method P100 for graphics memory allocation and the system 001 for graphics memory allocation provided in this specification, the target data are labeled and classified so that the target data are classified into the first data that are not to be reused and the second data that can be reused. In addition, the target graphics memory pool is partitioned by using a label of the target data so that different graphics memory allocation policies are used for different types of target data. The method P100 for graphics memory allocation and the 001 for graphics memory allocation provided in this specification enable the first data in multiple serial sub-tasks to share graphics memory space by time division at different moments. In addition, the method P100 for graphics memory allocation and the system 001 for graphics memory allocation provided in this specification can implement transparent sharing of the graphics memory space corresponding to the first data between the serial sub-tasks without any modification to upper-layer code, and significantly reduce graphics memory consumption generated during the running of the target task while maintaining computing performance unchanged. In some embodiments, the method P100 for graphics memory allocation and the system 001 for graphics memory allocation provided in this specification can save more than 60% of graphics memories. According to the method P100 for graphics memory allocation and the system 001 for graphics memory allocation provided in this specification, both upper-layer Python code and a deployment method do not need to be modified, thereby ensuring seamless and smooth data migration and implementing transparency and non-opinionated performance. According to the method P100 for graphics memory allocation and the system 001 for graphics memory allocation provided in this specification, a graphics memory allocation policy can be dynamically adjusted during the first, second, and subsequent running to adapt to characteristics of an original framework. The method P100 for graphics memory allocation and the system 001 for graphics memory allocation provided in this specification can be flexibly deployed in environments such as cloud native containers and physical bare metal machines.

Another aspect of this specification provides a non-transitory storage medium, storing at least one set of executable instructions for performing graphics memory allocation. When the executable instructions are executed by a processor, the executable instructions instruct the processor to implement the steps of the method P100 for graphics memory allocation described in this specification. In some possible implementations, various aspects of this specification can further be implemented in a form of a program product including program code. When the program product runs on the server 200, the program code is used to enable the server 200 to perform the steps of the method P100 for graphics memory allocation described in this specification. The program product for implementing the above-mentioned method can include the program code by using a portable compact disc read-only memory (CD-ROM), and can run on the server 200. However, the program product in this specification is not limited thereto. In this specification, a readable storage medium can be any tangible medium including or storing a program, where the program can be used by or in combination with an instruction execution system. The program product can employ one readable medium or any combination of a plurality of readable media. The readable medium can be a readable signal medium or a readable storage medium. For example, the readable storage medium can be but is not limited to, an electrical, magnetic, optical, electromagnetic, infrared, or semiconductor system, apparatus, or device, or any combination thereof. More specific examples of the readable storage medium include an electrical connection having one or more wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. The computer-readable storage medium can include data signals propagated in a baseband or as a part of a carrier, and the data signals carry readable program code. Such propagated data signals can take a variety of forms, including, but not limited to, electromagnetic signals, optical signals, or any suitable combination thereof. The readable storage medium can alternatively be any readable medium other than a readable storage medium. The readable medium can send, propagate, or transmit a program that is used by or in combination with an instruction execution system, apparatus, or device. Program code included on the readable storage medium can be transmitted by using any suitable medium, including but not limited to wireless, wired, optical cable, and RF media, or any suitable combination thereof. Program code for performing the operations in this specification can be compiled in one or any combination of a plurality of programming languages, including object-oriented programming languages, such as Java and C++, as well as conventional procedural programming languages such as "C" or similar programming languages. The program code can be executed entirely or partially on the server 200, as an independent software package, partially on the server 200 and partially on a remote computing device, or entirely on a remote computing device.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing are feasible or can be advantageous.

In conclusion, upon reading the detailed disclosure, a person skilled in the art can understand that the above-mentioned detailed disclosure can be presented only by way of example but not limitation. Although not explicitly specified here, a person skilled in the art can understand that this specification contemplates various reasonable variations, improvements, and modifications to the embodiments. These variations, improvements, and modifications are intended to be suggested by this specification and fall within the spirit and scope of the example embodiments of this specification.

In addition, some terms in this specification have been used to describe the embodiments of this specification. For example, "one embodiment", "an embodiment", and/or "some embodiments" mean/means that a particular feature, structure, or characteristic de scribed in combination with this embodiment can be included in at least one embodiment of this specification. Therefore, it can be emphasized and it should be understood that two or more references to "an embodiment" or "one embodiment" or "an alternative embodiment" in various parts of this specification do not necessarily refer to the same embodiment. In addition, the specific feature, structure, or characteristic can be suitably combined in one or more embodiments of this specification.

It should be understood that, in the above-mentioned description of the embodiments of this specification, to help understanding a feature, this specification combines various features in a single embodiment, accompany drawing, or description thereof for simplification of this specification. However, this does not mean that a combination of these features is necessary. It is entirely possible for a person skilled in the art to label some devices as separate embodiments for understanding upon reading this specification. In other words, the embodiments in this specification may also be understood as an integration of multiple secondary embodiments. Content of each secondary embodiment is also valid when its features are less than all features in a single previously disclosed embodiment.

All patents, patent applications, publications of patent applications, and other materials, such as articles, books, specifications, publications, documents, and things, referenced in this specification are hereby incorporated here. All content used for all purposes, except any prosecution file history related to the content, any same prosecution file history that is inconsistent with or in conflict with this document, or any same prosecution file history that may have limited impact on the broadest scope of the claims, will now or later be associated with this document. For example, if there is any inconsistency or conflict between the description, definition, and/or usage of a term associated with any included material and the term, description, definition, and/or usage associated with this document, the term in this document prevails.

Finally, it should be understood that, the implementations in this application disclosed here are illustrative of the principles of the implementations in this specification. Other modified embodiments also fall within the scope of this specification. Accordingly, the embodiments disclosed in this specification are used as only examples rather than limitations. A person skilled in the art can implement this application in this specification by using an alternative configuration in accordance with the embodiments in this specification. Therefore, the embodiments of this specification are not limited to the embodiments precisely described in this application.

What is claimed is:

1. A computer-implemented method for graphics memory allocation, comprising:

in response to a graphics memory allocation request for graphics memory needed during running of a target task comprising multiple sub-tasks that are serial, classifying target data generated during running of each sub-task of the multiple sub-tasks, wherein the graphics memory allocation request is generated during the running of the target task, wherein a type of the target data comprises at least first data, and wherein the first data is not used by a subsequent sub-task;

allocating multiple target graphics memory pools to the multiple sub-tasks, wherein the multiple sub-tasks are in a one-to-one correspondence with the multiple target graphics memory pools, and wherein a capacity of each target graphics memory pool of the multiple target graphics memory pools is determined using at least one forward inference;

dividing each target graphics memory pool of the multiple target graphics memory pools into at least one graphics memory block based on a type of the target data, wherein the at least one graphics memory block comprises at least a first graphics memory block corresponding to the first data, and wherein multiple first graphics memory blocks corresponding to the multiple sub-tasks are mapped to a same target physical memory address, wherein only one of the multiple first graphics memory blocks occupies the same target physical memory address at a time; and upon completion of a current sub-task, clearing graphics memory space corresponding to the same target physical memory address that stored the first data of the current sub-task, wherein the graphics memory space is available for storing the first data of a next sub-task.

2. The computer-implemented method of claim 1, further comprising:

during running of each sub-task of multiple sub-tasks:

storing the target data in a corresponding graphics memory block based on the type of the target data.

3. The computer-implemented method of claim 1, wherein classifying target data generated during running of each sub-task of multiple sub-tasks, comprises:

adding a type label to the target data based on the type of the target data, wherein the type label comprises at least a first label corresponding to the first data.

4. The computer-implemented method of claim 3, wherein dividing each target graphics memory pool of the multiple target graphics memory pools into at least one graphics memory block based on a type of the target data, comprises:

dividing at least a part of graphics memory space of each target graphics memory pool into the first graphics memory block;

allocating the first graphics memory block to the first data; and mapping the multiple first graphics memory blocks to the same target physical memory address.

5. The computer-implemented method of claim 4, wherein:

the multiple first graphics memory blocks are virtual graphics memories, and mapping the multiple first graphics memory blocks to the same target physical memory address, comprises:

mapping the multiple first graphics memory blocks to multiple virtual graphics memories based on a singleton pattern;

mapping the multiple virtual graphics memories to the same target physical memory address; and feeding back multiple virtual graphics memory pointers, wherein each virtual graphic memory pointer of the multiple virtual graphics memory pointers comprises a same target physical memory address and a capacity of the first graphics memory block corresponding to each virtual graphics memory pointer.

6. The computer-implemented method of claim 4, wherein:

the type of the target data comprises second data;

the second data is used by a subsequent sub-task;

the type label comprises a second label corresponding to the second data;

the at least one graphics memory block comprises a second graphics memory block corresponding to the second data; and dividing each target graphics memory pool of the multiple target graphics memory pools into at least one graphics memory block based on a type of the target data, comprises:

dividing at least a part of graphics memory space of each target graphics memory pool into the second graphics memory block; and allocating the second graphics memory block to the second data.

7. The computer-implemented method of claim 6, wherein:

the second data comprises input data, output data, and default data;

the second label comprises:

an input data label, corresponding to the input data;

an output data label, corresponding to the output data; and a default data label, corresponding to the default data; and the second graphics memory block comprises:

an input/output graphics memory block, corresponding to the input data and the output data; and a default graphics memory block, corresponding to the default data.

8. The computer-implemented method of claim 4, wherein:

the first data comprises activation value data and workspace data;

the first label comprises:

an activation value data label, corresponding to the activation value data; and a workspace data label, corresponding to the workspace data; and the first graphics memory block comprises:

an activation value graphics memory block, corresponding to the activation value data; and a workspace graphics memory block, corresponding to the workspace data.

9. A non-transitory, computer-readable medium storing one or more instructions executable by a computer system to perform one or more operations, comprising:

in response to a graphics memory allocation request for graphics memory needed during running of a target task comprising multiple sub-tasks that are serial, classifying target data generated during running of each sub-task of the multiple sub-tasks, wherein the graphics memory allocation request is generated during the running of the target task, wherein a type of the target data comprises at least first data, and wherein the first data is not used by a subsequent sub-task;

allocating multiple target graphics memory pools to the multiple sub-tasks, wherein the multiple sub-tasks are in a one-to-one correspondence with the multiple target graphics memory pools, and wherein a capacity of each target graphics memory pool of the multiple target graphics memory pools is determined using at least one forward inference;

dividing each target graphics memory pool of the multiple target graphics memory pools into at least one graphics memory block based on a type of the target data, wherein the at least one graphics memory block comprises at least a first graphics memory block corresponding to the first data, and wherein multiple first graphics memory blocks corresponding to the multiple sub-tasks are mapped to a same target physical memory address, wherein only one of the multiple first graphics memory blocks occupies the same target physical memory address at a time; and upon completion of a current sub-task, clearing graphics memory space corresponding to the same target physical memory address that stored the first data of the current sub-task, wherein the graphics memory space is available for storing the first data of a next sub-task.

10. The non-transitory, computer-readable medium of claim 9, further comprising:

during running of each sub-task of multiple sub-tasks:

storing the target data in a corresponding graphics memory block based on the type of the target data.

11. The non-transitory, computer-readable medium of claim 9, wherein classifying target data generated during running of each sub-task of multiple sub-tasks, comprises:

adding a type label to the target data based on the type of the target data, wherein the type label comprises at least a first label corresponding to the first data.

12. The non-transitory, computer-readable medium of claim 11, wherein dividing each target graphics memory pool of the multiple target graphics memory pools into at least one graphics memory block based on a type of the target data, comprises:

dividing at least a part of graphics memory space of each target graphics memory pool into the first graphics memory block;

allocating the first graphics memory block to the first data; and mapping the multiple first graphics memory blocks to the same target physical memory address.

13. The non-transitory, computer-readable medium of claim 12, wherein:

the multiple first graphics memory blocks are virtual graphics memories; and mapping the multiple first graphics memory blocks to the same target physical memory address, comprises:

mapping the multiple first graphics memory blocks to multiple virtual graphics memories based on a singleton pattern;

mapping the multiple virtual graphics memories to the same target physical memory address; and feeding back multiple virtual graphics memory pointers, wherein each virtual graphic memory pointer of the multiple virtual graphics memory pointers comprises a same target physical memory address and a capacity of the first graphics memory block corresponding to each virtual graphics memory pointer.

14. The non-transitory, computer-readable medium of claim 12, wherein:

the type of the target data comprises second data;

the second data is used by a subsequent sub-task;

the type label comprises a second label corresponding to the second data;

the at least one graphics memory block comprises a second graphics memory block corresponding to the second data; and dividing each target graphics memory pool of the multiple target graphics memory pools into at least one graphics memory block based on a type of the target data, comprises:

dividing at least a part of graphics memory space of each target graphics memory pool into the second graphics memory block; and allocating the second graphics memory block to the second data.

15. The non-transitory, computer-readable medium of claim 14, wherein:

the second data comprises input data, output data, and default data;

the second label comprises:

an input data label, corresponding to the input data;

an output data label, corresponding to the output data; and a default data label, corresponding to the default data; and the second graphics memory block comprises:

an input/output graphics memory block, corresponding to the input data and the output data; and a default graphics memory block, corresponding to the default data.

16. The non-transitory, computer-readable medium of claim 12, wherein:

the first data comprises activation value data and workspace data;

the first label comprises:

an activation value data label, corresponding to the activation value data; and a workspace data label, corresponding to the workspace data; and the first graphics memory block comprises:

an activation value graphics memory block, corresponding to the activation value data; and a workspace graphics memory block, corresponding to the workspace data.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

in response to a graphics memory allocation request for graphics memory needed during running of a target task comprising multiple sub-tasks that are serial, classifying target data generated during running of each sub-task of the multiple sub-tasks, wherein the graphics memory allocation request is generated during the running of the target task, wherein a type of the target data comprises at least first data, and wherein the first data is not used by a subsequent sub-task;

allocating multiple target graphics memory pools to the multiple sub-tasks, wherein the multiple sub-tasks are in a one-to-one correspondence with the multiple target graphics memory pools, and wherein a capacity of each target graphics memory pool of the multiple target graphics memory pools is determined using at least one forward inference;

dividing each target graphics memory pool of the multiple target graphics memory pools into at least one graphics memory block based on a type of the target data, wherein the at least one graphics memory block comprises at least a first graphics memory block corresponding to the first data, and wherein multiple first graphics memory blocks corresponding to the multiple sub-tasks are mapped to a same target physical memory address, wherein only one of the multiple first graphics memory blocks occupies the same target physical memory address at a time; and upon completion of a current sub-task, clearing graphics memory space corresponding to the same target physical memory address that stored the first data of the current sub-task, wherein the graphics memory space is available for storing the first data of a next sub-task.

18. The computer-implemented system of claim 17, further comprising:

during running of each sub-task of multiple sub-tasks:

storing the target data in a corresponding graphics memory block based on the type of the target data.

19. The computer-implemented system of claim 17, wherein classifying target data generated during running of each sub-task of multiple sub-tasks, comprises:

adding a type label to the target data based on the type of the target data, wherein the type label comprises at least a first label corresponding to the first data.

20. The computer-implemented system of claim 19, wherein dividing each target graphics memory pool of the multiple target graphics memory pools into at least one graphics memory block based on a type of the target data, comprises:

dividing at least a part of graphics memory space of each target graphics memory pool into the first graphics memory block;

allocating the first graphics memory block to the first data; and mapping the multiple first graphics memory blocks to the same target physical memory address.

* * * * *